(12) United States Patent
Ruddell et al.

(10) Patent No.: US 10,807,772 B2
(45) Date of Patent: *Oct. 20, 2020

(54) REUSABLE BAG CLAMP WITH RECIPROCATING BLADE

(76) Inventors: Gregory Roy Ruddell, Aldergrove (CA); Robert J. Halas, Surrey (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/476,733

(22) Filed: May 21, 2012

(65) Prior Publication Data

US 2013/0305540 A1    Nov. 21, 2013

(51) Int. Cl.
| | | |
|---|---|---|
| *B25B 25/00* | (2006.01) | |
| *B65D 33/25* | (2006.01) | |
| *B65D 33/00* | (2006.01) | |
| *B65D 33/16* | (2006.01) | |

(52) U.S. Cl.
CPC ......... *B65D 33/2591* (2013.01); *B65D 33/00* (2013.01); *B65D 33/1658* (2013.01); *B65D 33/1675* (2013.01); *B65D 33/25* (2013.01); *Y02W 30/807* (2015.05); *Y10T 24/15* (2015.01)

(58) Field of Classification Search
CPC .... B65D 33/1675; B65D 33/16; B65D 33/00; B65D 33/06; B65D 33/1616; B65D 33/25; Y10T 24/15; Y10T 24/158; Y10T 24/4453; B26F 3/02; Y02W 30/807
USPC .......... 7/158; 30/123, 280, 283, 294, 1.5, 2, 30/124, DIG. 3, 278, 282, 285, 289, 335; 24/30.5 R, 30.5 S, 30.5 L, 501, 502, 505, 24/327, 517; 248/95, 99, 101, 316.1, 248/316.7, 316.6; D8/102, 104, 105; 83/614, 455
See application file for complete search history.

(56) References Cited

U.S. PATENT DOCUMENTS

| | | | | |
|---|---|---|---|---|
| 10,132 A | * | 10/1853 | Grisrrold | B26D 7/14 83/18 |
| 101,542 A | * | 4/1870 | Teed | B26D 7/025 33/485 |
| 234,476 A | * | 11/1880 | Hood | B27B 27/04 83/468 |
| 381,265 A | * | 4/1888 | Martens | B65D 33/1675 24/30.5 R |

(Continued)

FOREIGN PATENT DOCUMENTS

| | | |
|---|---|---|
| DE | 9104600 | 6/1991 |
| DE | 102004018589 | 11/2005 |

(Continued)

OTHER PUBLICATIONS

WIPO, Canadian International Searching Authority, International Search Report dated Oct. 3, 2013 in International Patent Application No. PCT/CA2013/050388, 5 Pages.

(Continued)

*Primary Examiner* — Hadi Shakeri (57) ABSTRACT

An improved bag clamp comprises a first jaw member and a second jaw member. The first jaw member has an opening in a clamping surface thereof and the second jaw member a blade reciprocatingly mounted therein. A hinge couples the first jaw member and the second jaw member. The clamp is moveable between an open configuration in which the first jaw member and second jaw member are angularly spaced and a closed configuration in which the opening in the first jaw member is aligned with the blade of the second jaw member.

2 Claims, 10 Drawing Sheets

(56) References Cited

U.S. PATENT DOCUMENTS

| | | | | |
|---|---|---|---|---|
| 405,518 | A | * | 6/1889 | Morrison et al. .. B65D 33/1675 24/30.5 R |
| 614,407 | A | * | 11/1898 | Gamston et al. ...... B26D 7/025 83/455 |
| 840,928 | A | * | 1/1907 | Morton ................ B26D 7/018 33/32.3 |
| 1,459,735 | A | * | 6/1923 | Kraft ..................... B65D 33/30 24/30.5 R |
| 1,572,304 | A | * | 2/1926 | Morton ................... D06H 7/02 83/455 |
| 1,895,754 | A | * | 1/1933 | Finkenwirth .......... B26D 1/045 160/399 |
| 2,420,460 | A | | 5/1947 | Bowdoin et al. |
| 2,585,421 | A | * | 2/1952 | Armand ........................ 116/240 |
| 2,679,098 | A | * | 5/1954 | Deicken ......................... 30/293 |
| 3,669,115 | A | * | 6/1972 | Melges ............... A61B 17/326 24/518 |
| 3,774,251 | A | * | 11/1973 | Pellman .............................. 7/132 |
| 4,296,529 | A | | 10/1981 | Brown |
| 4,428,098 | A | * | 1/1984 | Coker ................ B65D 33/1675 24/30.5 R |
| 4,580,342 | A | | 4/1986 | Beuzart |
| 4,716,886 | A | * | 1/1988 | Schulman et al. ........... 606/120 |
| D299,008 | S | | 12/1988 | Naslund |
| 4,831,734 | A | * | 5/1989 | De Ruyter et al. ............. 30/124 |
| 4,847,956 | A | | 7/1989 | Levine |
| 4,887,335 | A | * | 12/1989 | Folkmar ............ B65D 33/1675 24/30.5 R |
| 5,014,431 | A | * | 5/1991 | Jebe et al. ...................... 30/124 |
| 5,054,168 | A | * | 10/1991 | Gandy ..................... B26F 3/02 24/30.5 L |
| 5,069,097 | A | * | 12/1991 | Mori ..................... B26D 1/185 83/455 |
| 5,167,608 | A | * | 12/1992 | Steffens, Jr. ....... B65D 33/2591 24/400 |
| 5,347,671 | A | * | 9/1994 | Hunts ............................... 7/156 |
| 5,379,489 | A | * | 1/1995 | Delk .................. B65D 33/1675 24/30.5 R |
| 5,428,871 | A | | 7/1995 | Iosif |
| D375,045 | S | | 10/1996 | Weber et al. |
| 5,604,959 | A | | 2/1997 | Bowen |
| 5,617,615 | A | | 4/1997 | Cutts, Sr. |
| 5,713,108 | A | * | 2/1998 | Solomon et al. ........ 24/30.5 R |
| D391,851 | S | | 3/1998 | Joergensen |
| 5,738,444 | A | * | 4/1998 | Lantz ................ B65D 33/1675 383/68 |
| 5,802,677 | A | | 9/1998 | Dorman et al. |
| 5,802,942 | A | * | 9/1998 | Cornell ................. B26D 1/045 402/4 |
| 5,860,215 | A | * | 1/1999 | Roskam et al. ................ 30/254 |
| D420,912 | S | | 2/2000 | Vaught |
| D423,353 | S | | 4/2000 | Blanchard et al. |
| 6,058,572 | A | | 5/2000 | Folkmar |
| 6,105,217 | A | | 8/2000 | Caradine et al. |
| D431,004 | S | | 9/2000 | Naslund |
| D447,691 | S | | 9/2001 | Messer |
| 6,363,588 | B1 | | 4/2002 | Caradine |
| 6,578,243 | B1 | * | 6/2003 | Hall ............................... 24/501 |
| D482,968 | S | | 12/2003 | Henriksson |
| 6,805,485 | B2 | | 10/2004 | Hogan et al. |
| 6,904,646 | B2 | | 6/2005 | Reynolds |
| 7,131,169 | B2 | | 11/2006 | Folkmar |
| 7,181,806 | B2 | | 2/2007 | Folkmar |
| 7,284,303 | B2 | | 10/2007 | Canegallo et al. |
| D566,511 | S | | 4/2008 | Seehoff et al. |
| RE40,756 | E | * | 6/2009 | Hall ............................... 24/501 |
| D642,913 | S | | 8/2011 | Osborn et al. |
| 2002/0096031 | A1 | * | 7/2002 | Yang ..................... B26D 1/185 83/614 |
| 2005/0016668 | A1 | * | 1/2005 | Powers et al. ................ 156/250 |
| 2005/0063616 | A1 | | 3/2005 | Chang |
| 2005/0120521 | A1 | | 6/2005 | Folkmar |
| 2011/0119872 | A1 | * | 5/2011 | Clearman ............... B26B 27/00 24/30.5 R |

FOREIGN PATENT DOCUMENTS

| | | |
|---|---|---|
| DE | 202006003686 | 7/2006 |
| WO | 02/076836 | 10/2002 |
| WO | 2005012123 | 2/2005 |
| WO | 2014029408 | 2/2014 |

OTHER PUBLICATIONS

WIPO, Canadian International Searching Authority, Written Opinion of the International Searching Authority dated Oct. 3, 2013 in International Patent Application No. PCT/CA2013/050388, 5 Pages.
WIPO, Canadian International Searching Authority, International Search Report dated Sep. 27, 2013 in International Patent Application No. PCT/CA2013/050389, 4 Pages.
WIPO, Canadian International Searching Authority, Written Opinion of the International Searching Authority dated Sep. 27, 2013 in International Patent Application No. PCT/CA2013/050389, 5 Pages.
English Abstract of DE 202006003686 obtained from esp@cenet.
English Abstract of corresponding document WO 2005100185 for DE 102004018589 obtained from esp@cenet.
WIPO, International Search Report dated Apr. 24, 2013 in International Patent Application No. PCT/EP2012/003588, 4 pages.

* cited by examiner

REUSABLE BAG CLAMP WITH RECIPROCATING BLADE

BACKGROUND OF THE INVENTION

Field of the Invention

The present invention relates to a bag clamp and, in particular, to a reusable bag clamp which may be used to open a sealed bag and releasably seal the opened bag.

Description of the Related Art

It is known to releasably seal an open-mouthed bag with a clamp. One type of clamp which is commonly used comprises longitudinally extending, elongate jaws which are pivotably connected at first ends thereof and releasably connectable with a locking mechanism at second ends thereof. Examples of such clamps are disclosed in U.S. Pat. Nos. 4,887,335 and 6,058,572 both to Folkmar and the full disclosures of which are incorporated herein by reference. In operation, the elongate jaws are pivoted about their first ends to bring the clamp into engagement with the bag. The locking mechanism is then secured to releasably connect the second ends of the elongate jaws and thereby seal the bag. The bag may later be accessed by releasing the latch and pivoting the elongate jaws open to release the bag from the clamp.

SUMMARY OF THE INVENTION

It is an object of the present invention to provide an improved bag clamp.

There is accordingly provided an improved bag clamp comprising a first jaw member and a second jaw member. The first jaw member has an opening in a clamping surface thereof and the second jaw member has a slot extending therethrough. A hinge couples the first jaw member and the second jaw member. The clamp is moveable between an open configuration in which the first jaw member and second jaw member are angularly spaced-apart and a closed configuration in which the opening in the first jaw member is aligned with the slot in the second jaw member. The first jaw member may be an elongate jaw member and the opening may be a channel extending along a length of the first jaw member. The second jaw member may be an elongate jaw member and the slot may extend along a length of the second jaw member. There may be a releasable locking mechanism for locking the clamp in the closed configuration.

There is also provided an improved bag clamp in which the first jaw member has an opening in a clamping surface thereof and the second jaw member has a blade reciprocatingly mounted thereto. The blade is movable along a length of the second elongate jaw member. A hinge couples the first jaw member and the second jaw member. The clamp is moveable between an open configuration in which the first jaw member and second jaw member are angularly spaced-apart and a closed configuration in which the opening in the first jaw member is aligned with the blade of the second jaw member. The first jaw member may be an elongate jaw member and the opening may extend along a length of the first jaw member and, in one embodiment, the first jaw member may include a hollow and the opening may be an access to the hollow. The second jaw member may be an elongate jaw member and the blade may reciprocate along a length of the second jaw member. There may be a locking mechanism for locking the clamp in the closed configuration. The blade may be movable between a retracted position in which the blade is disposed within the second jaw member and an extended position in which the blade extends from a clamping surface of the second jaw member. The blade may be biased towards the retracted position. There may be a releasable safety mechanism for maintaining the blade in the retracted position. The blade may be a bi-directional cutting blade.

There is further provided an improved bag clamp in which there is a longitudinal opening in a clamping surface of the first elongate jaw member and a longitudinal slot in a clamping surface of the second jaw member. A hinge couples the first jaw member to the second jaw member. The clamp is movable between an open configuration in which the first jaw member and the second jaw member are angularly spaced-apart and a closed configuration in which the opening in the clamping surface of the first jaw member is aligned with the slot extending through the clamping surface of the second jaw member. There is a cutting mechanism which includes a blade reciprocatingly mounted on a guide rod disposed within the second elongate jaw member. The blade is movable along a length of the second elongate jaw member. The blade is also moveable between a retracted position in which the blade is disposed within the second jaw member and an extended position in which the blade extending through the slot in the clamping surface of the second jaw member. There is also a releasable locking mechanism for locking the clamp in the closed configuration.

The bag clamp disclosed herein may be a reusable bag clamp which may be used to open a sealed bag and releasably seal the opened bag.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
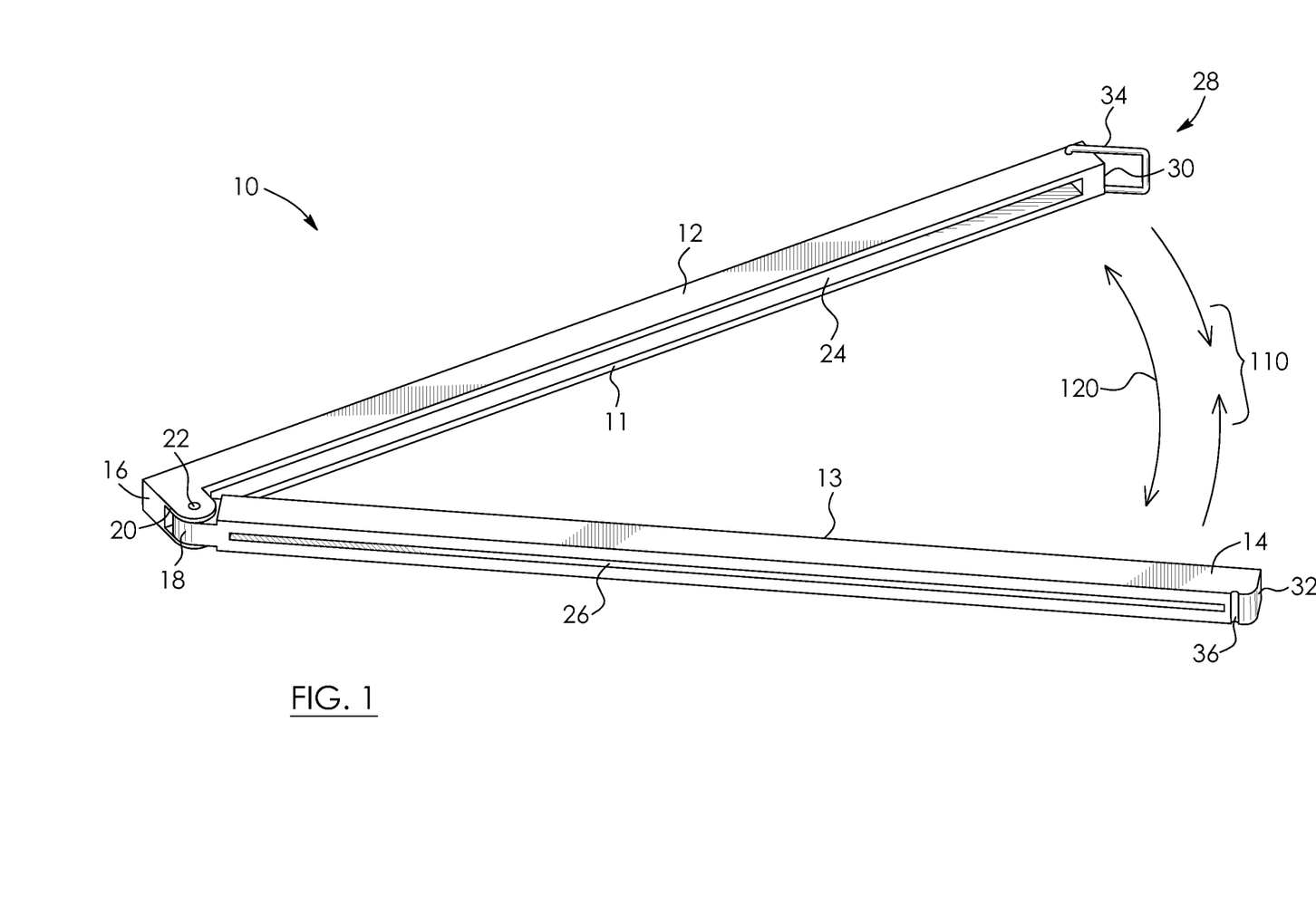
FIG. 1 is a perspective view of a first embodiment of an improved bag clamp showing the clamp in an open configuration.

Referring to the drawings and first to FIG. 1 a first embodiment of an improved bag clamp 10 is shown. The clamp 10 includes a first jaw member 12 and a second jaw member 14 which are pivotably coupled to one another. The jaws 12 and 14 are longitudinally extending, elongate jaws which are pivotably connected at respective first ends 16 and 18 thereof. In this example, the first jaw 12 has a clevis 20 which receives the second jaw 14. There is a clevis pin 22 which extends through the second jaw 14 and the second jaw is pivotable about the clevis pin which functions as a pivot pin for the second jaw, i.e. the clevis 20 and clevis pin 22 may function as a hinge. The jaws 12 and 14 are accordingly able to pivot towards one another as indicated generally by arrows 110 and away from one another as indicated generally by arrows 120. An opening in the form of a channel 24 extends along a length of a clamping surface 11 of the first jaw 12 and a slot 26 extends along a length of a clamping surface 13 the second jaw 14.

Figure 2:
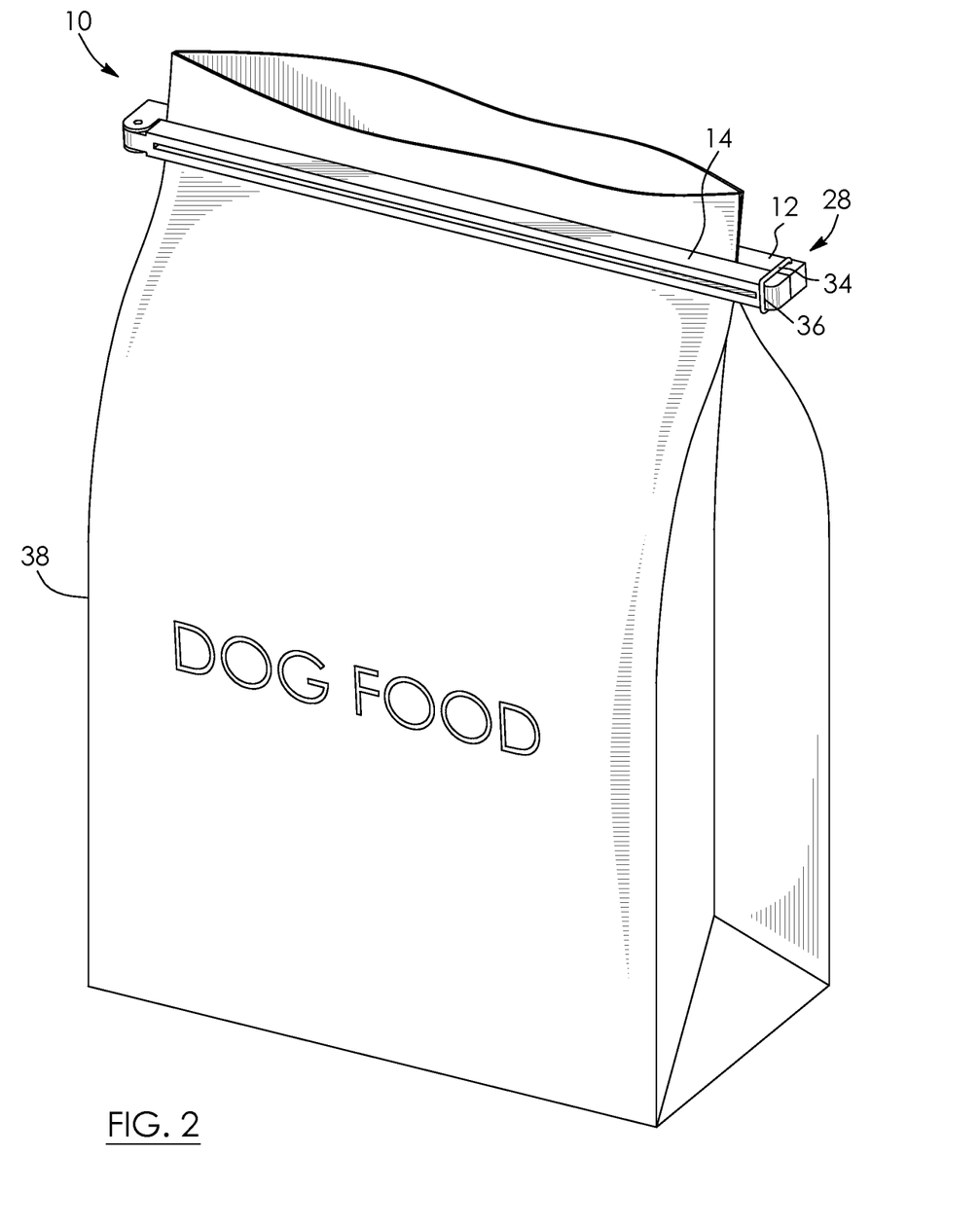
FIG. 2 is a perspective view of the clamp of FIG. 1 showing the clamp in a closed configuration and being used to seal an open-mouthed bag.

There is a locking mechanism 28 which may be used to releasably connect the jaws 12 and 14 at respective second ends 30 and 32 thereof. In this example, the locking mechanism 28 includes a latch 34 and a groove 36. The latch 34 is pivotably mounted on the first jaw 12 and the groove 36 extends transversely along the second jaw 14. Referring now to FIG. 2, when the clamp 10 is used to seal an open-mouthed bag 38, the locking mechanism 28 is engaged by bringing the latch 34 into engagement with the groove 36. The clamp 10 is thereby clamped to the bag 38 and maintained in a closed configuration in which a portion of the bag is compressed between planar clamping surfaces of the jaws 12 and 14 and the bag is sealed. The locking mechanism 28 may however be released, and the jaws 12 and 14 pivoted away from one another, to move the clamp 10 to an open configuration and released from the bag. This allows access to the bag 38 which may later be resealed, i.e. the clamp 10 may be used to releasably seal the bag. In the open configuration the jaws 12 and 14 are angularly spaced-apart as shown in FIG. 1.

Figure 3:
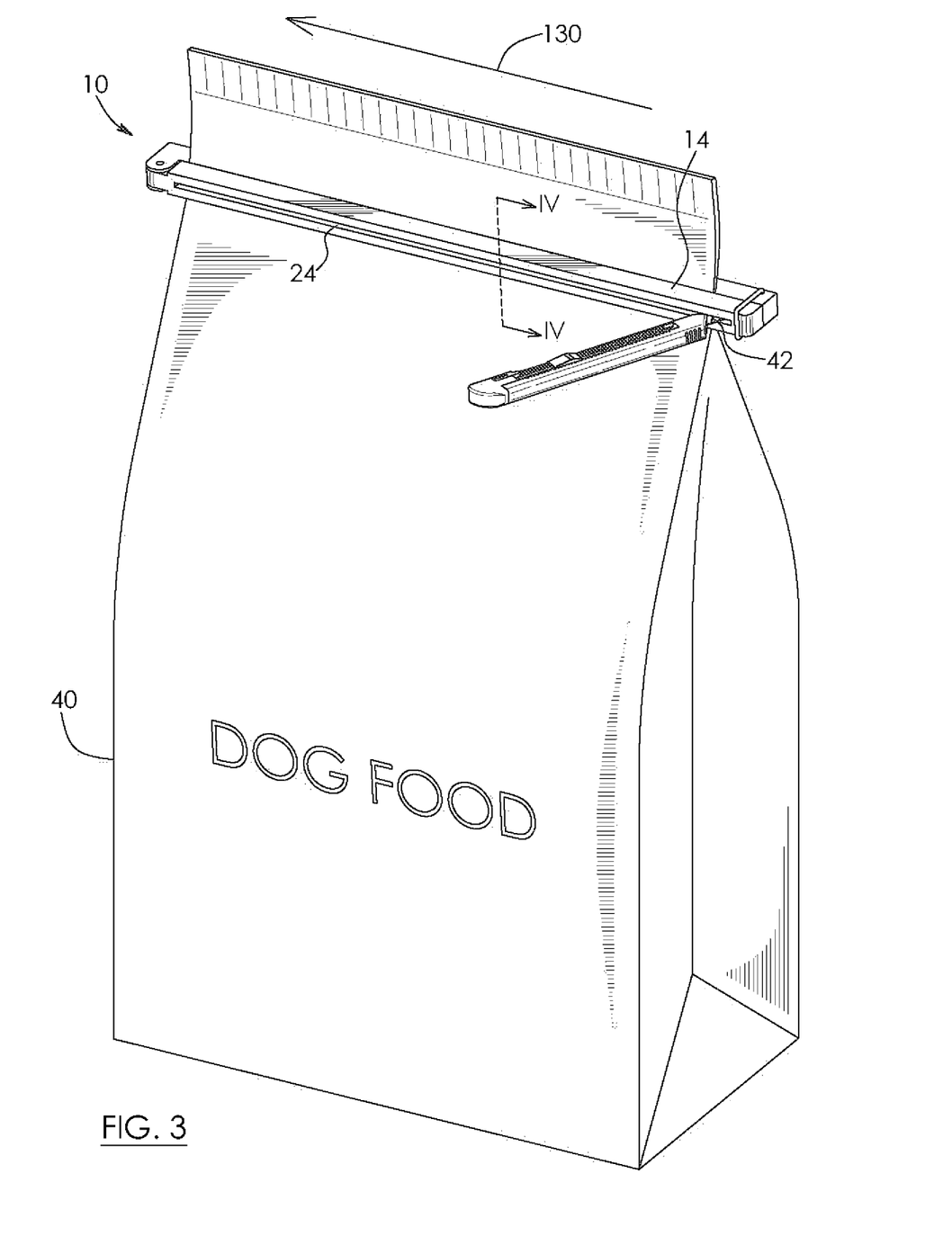
FIG. 3 is a perspective view of the clamp of FIG. 1 showing the clamp in a closed configuration and being used to open a sealed bag.
Figure 4:
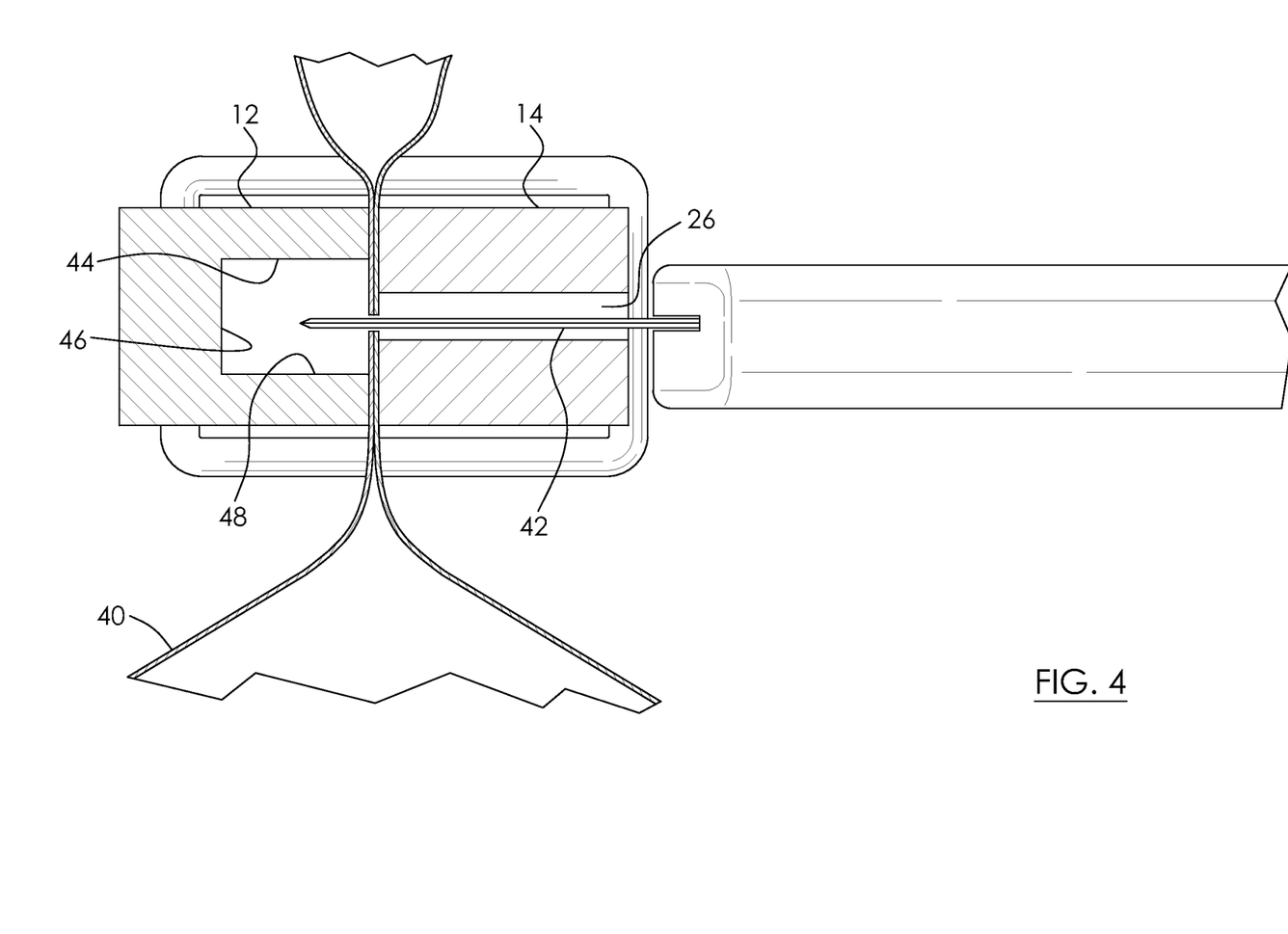
FIG. 4 is a sectional view taken along lines IV-IV of FIG. 3.

The clamp 10 may also be used to open a sealed bag 40 as shown in FIGS. 3 and 4. The clamp 10 is clamped to the bag 40 as describe above and a blade 42 is inserted into one end of the slot 24 in the second jaw 14. The blade 42 should be inserted with sufficient force to pierce the bag 40 as shown in FIG. 4. Moving the blade 42 along the slot 26 in the direction generally indicated by arrow 130, shown in FIG. 3, should then result in the bag 40 being cut open. The channel 24 in the first jaw 12 is aligned with the slot 26 in the second jaw 14 when the clamp 10 is in the closed configuration. The blade 42 is accordingly received by the channel 24 in the first jaw 12 and the channel walls 44, 46 and 48 prevent the blade 42 from extending through clamp 10.

Figure 5:
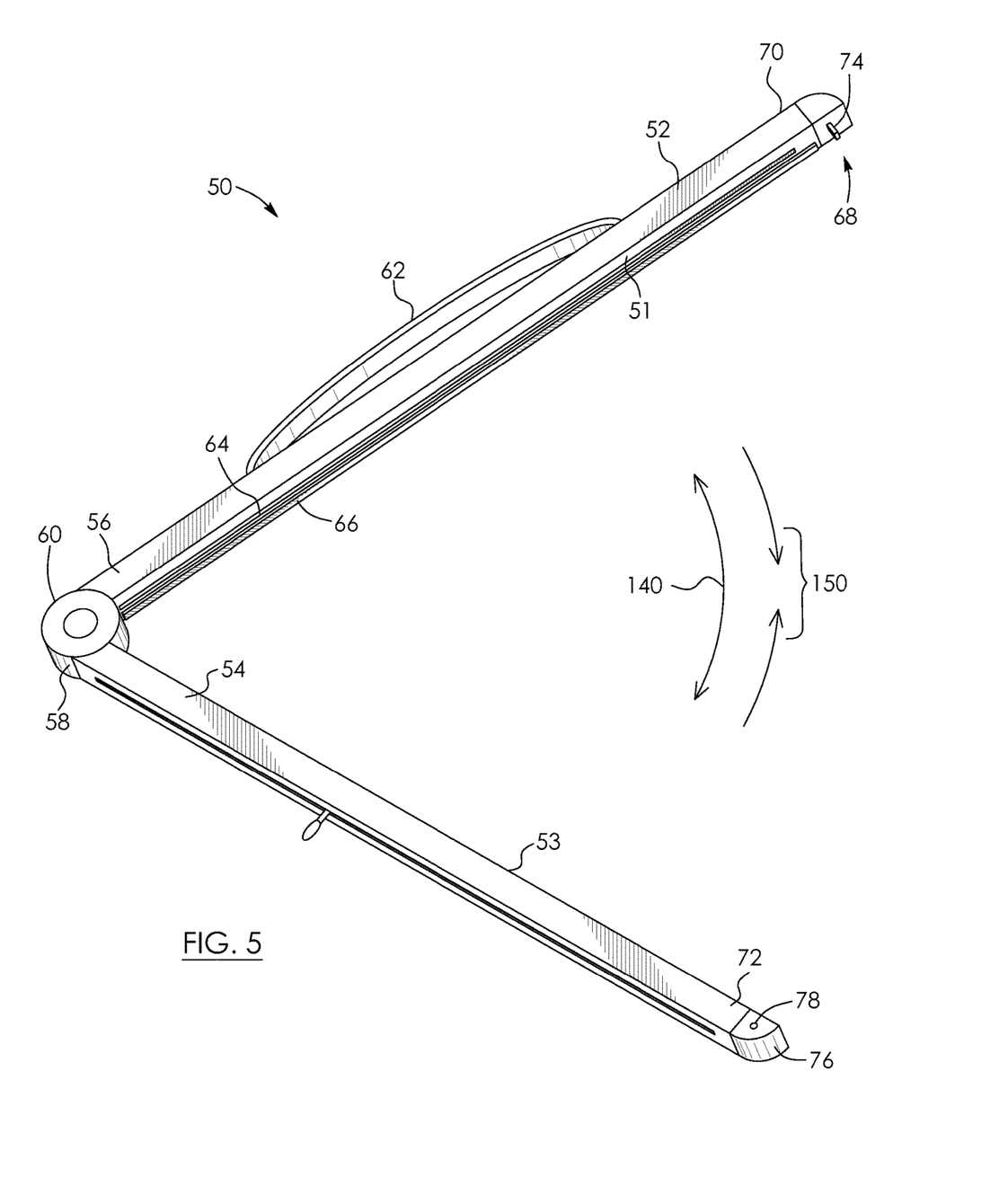
FIG. 5 is a perspective view of a second embodiment of an improved bag clamp showing the clamp in an open configuration.
Figure 6:
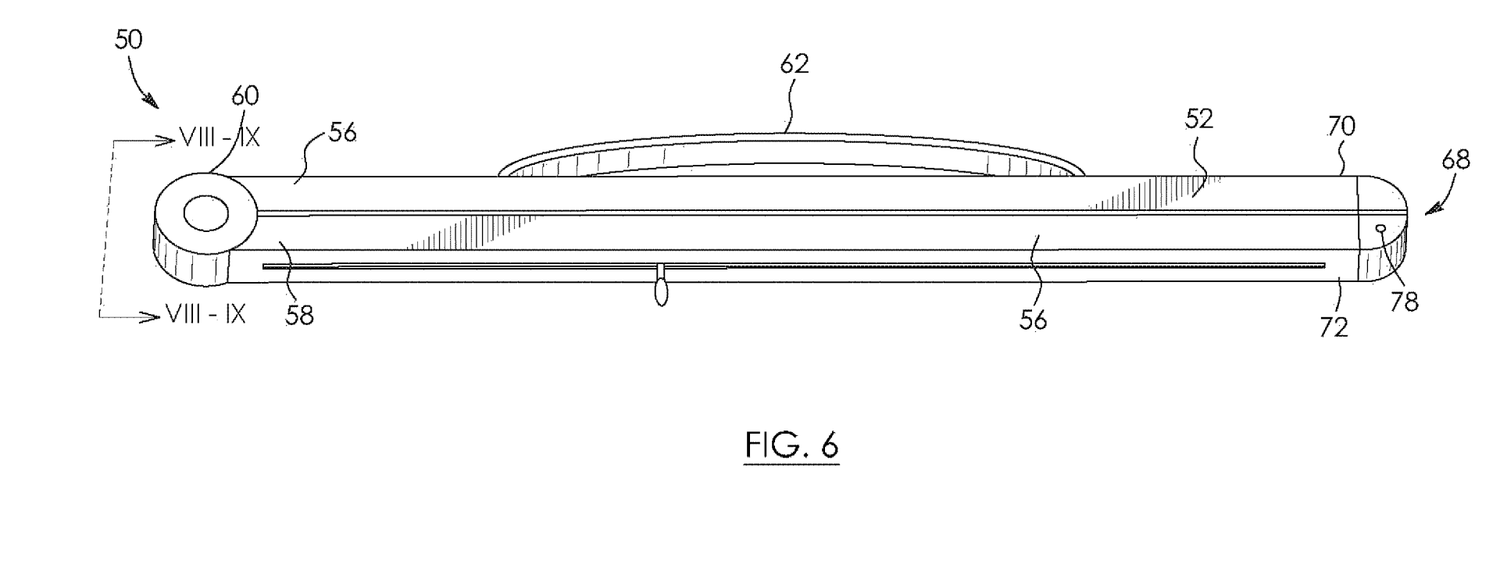
FIG. 6 is a perspective view of the clamp of FIG. 5 showing the clamp in a closed configuration.

Referring now to FIGS. 5 and 6 a second embodiment of an improved bag clamp 50 is shown. The clamp 50 includes a first jaw member 52 and a second jaw member 54 which, in this example, are hollow square tubes of anodized aluminum. The jaws 52 and 54 are longitudinally extending, elongate jaws which are connected at respective first ends 56 and 58 thereof to a hinge 60 which, in this example, is an interleaved wheel. The jaws 52 and 54 are moveable in the directions generally indicated by arrows 140 and 150 by rotating the interleaved wheel. The clamp 50 is accordingly moveable between an open configuration, as shown in FIG. 5, and a closed configuration as shown in FIG. 6. A handle 62 is mounted on the first jaw 52. There is also an opening in the form of an access 64 and a pad 66 each extending along a length of a clamping surface 51 of the first jaw 52. In this example, the pad 66 is a textured rubber pad.

Figures 7, 7A:
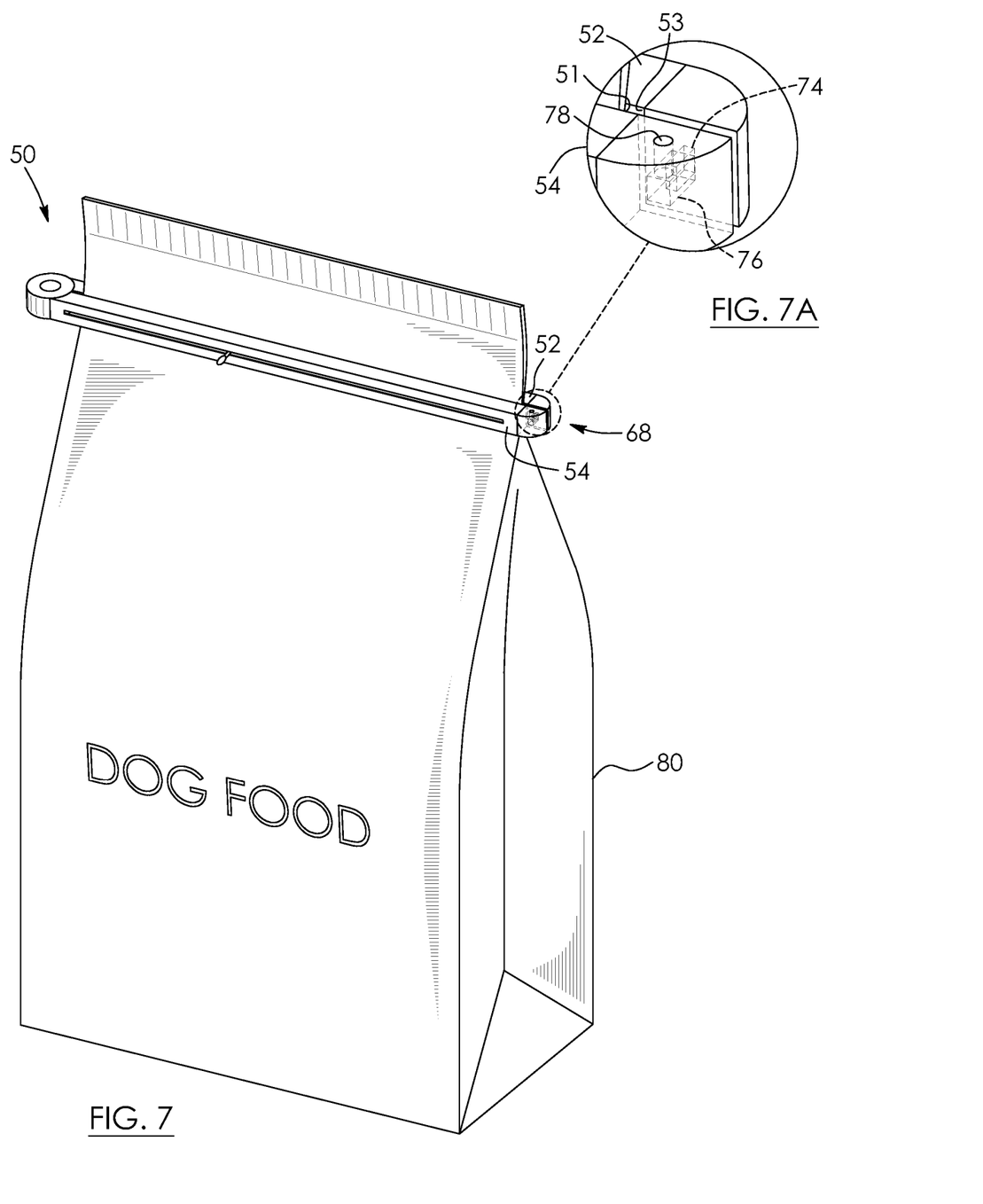
FIG. 7 is a perspective view of the clamp of FIG. 1 showing the clamp in a closed configuration and being used to seal an open-mouthed bag.
FIG. 7A is an enlarged view of a portion of FIG. 7.

There is a locking mechanism 68 which releasably connects the jaws 52 and 54 at respective second ends 70 and 72 thereof. In this example, the locking mechanism 68 is a ratcheted style graduated locking mechanism and includes a ratchet pin 74 mounted on the first jaw 52 which may incrementally engage an aperture 76 in the second jaw 54. The locking mechanism 68 also includes release button 78 which disengages the ratchet pin 74. Referring now to FIG. 7, when the clamp 50 is used to seal an open-mouth bag 80, the locking mechanism is engaged by bringing the ratchet pin 74 into incremental engagement with the aperture 76. The clamp 50 is thereby maintained in a closed configuration and clamped to the bag 80 in a manner such that a portion of the bag is compressed between respective planar clamping surfaces 51 and 53 of the jaws 52 and 54 and the bag is effectively sealed. The locking mechanism 68 may however be released, and the jaws 52 and 54 moved away from one another, to move the clamp 10 to an open configuration in which the jaws 52 and 54 are angularly spaced-apart. This allows access to the bag 80 which may later be resealed, i.e. the clamp 50 may be used to releasably seal the bag.

Figure 8:
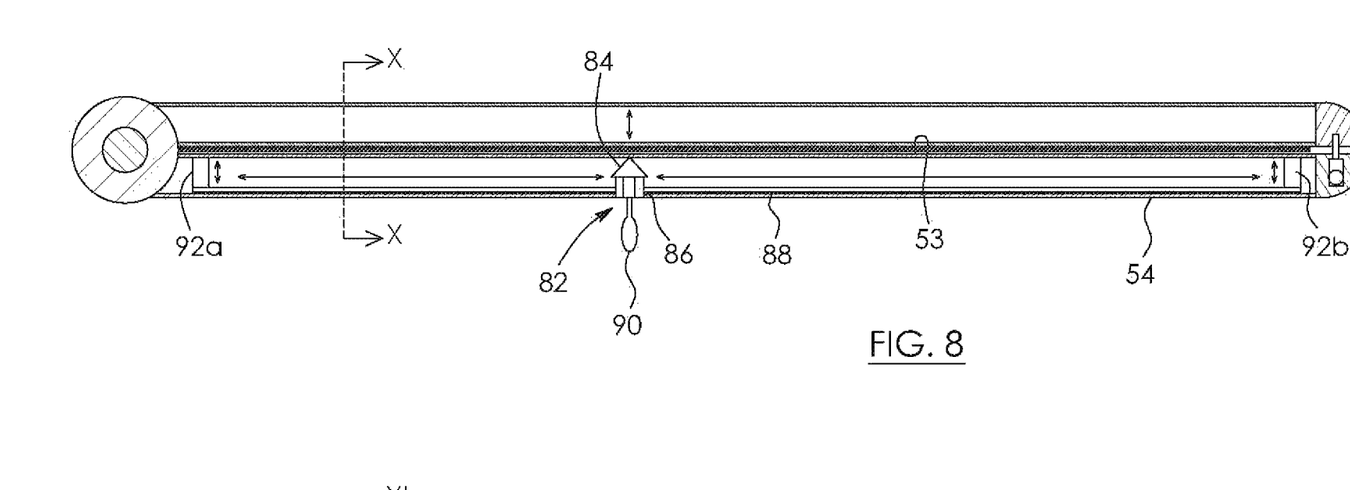
FIG. 8 is a sectional view taken along lines of VIII-VIII FIG. 6 showing a blade of the clamp in a retracted position.
Figure 9:
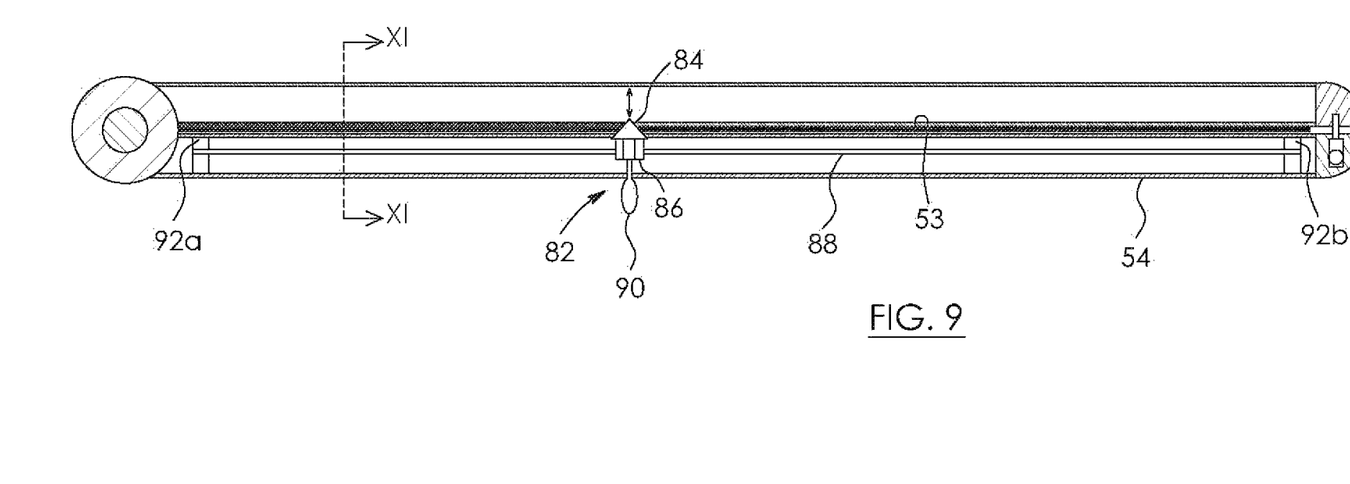
FIG. 9 is a sectional view taken along lines IX-IX of FIG. 6 showing a blade of the clamp in an extended position.
Figure 12:
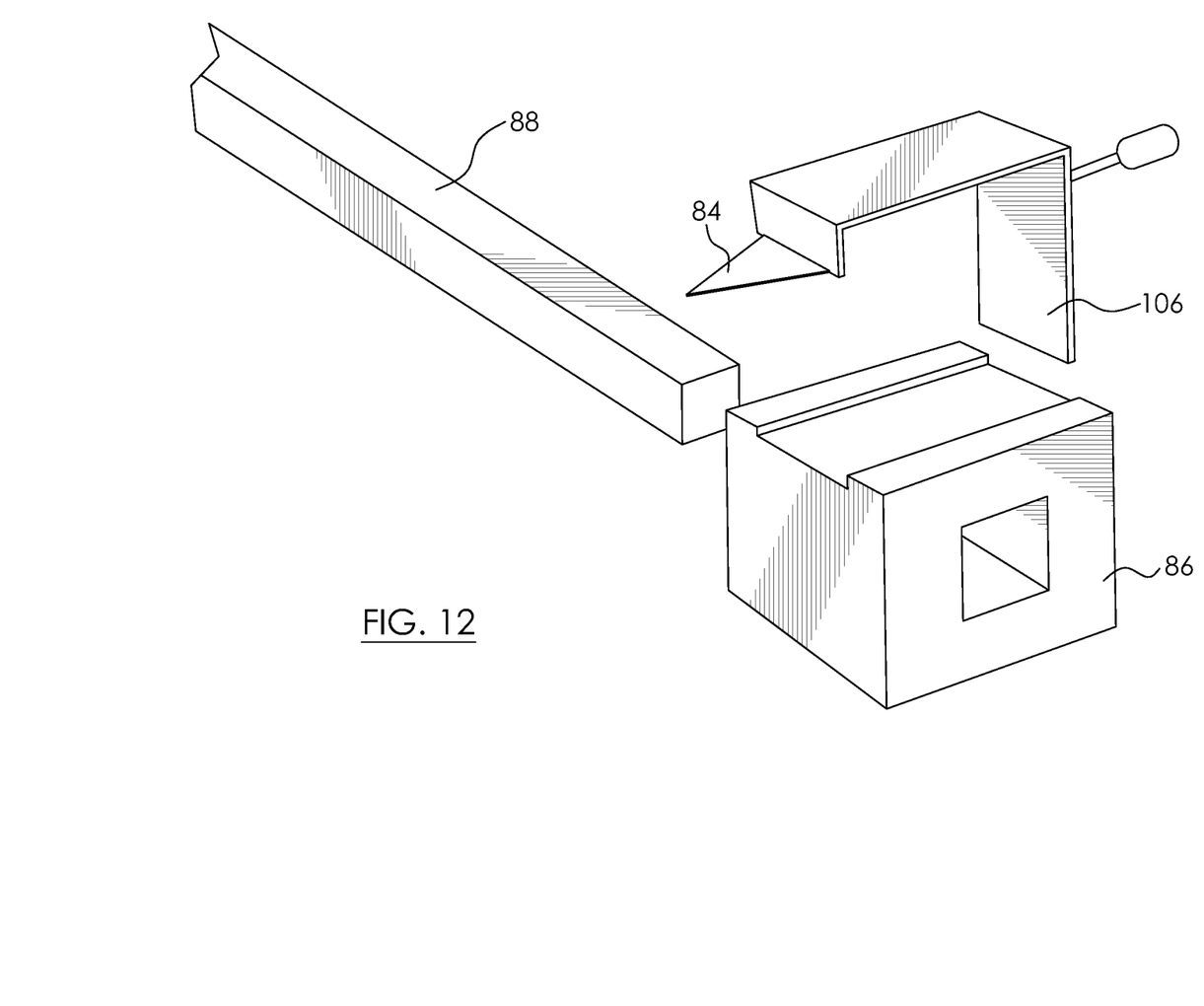
FIG. 12 is a detailed, exploded view of a cutting mechanism of the clamp of FIG. 5.

The clamp 50 is also provided with a cutting mechanism 82 which is best shown in FIGS. 8, 9 and 12. The cutting mechanism 82 includes a blade 84 disposed in the second jaw 54. In this example the blade 84 is a bi-directional blade and is mounted on a blade guide 86 which is slidable along a guide rod 88. The guide rod 88 extends substantially the length of the second jaw 54. The cutting mechanism 82 also includes a blade handle 90 which extends laterally outward from the second jaw 54. The blade handle 90 allows a user to reciprocate the blade 84 along the guide rod 88. The guide rod 88 is biased by springs 92a and 92b so that the blade 84 is biased to retract within the second jaw 54 for safety purposes as shown in FIG. 8. The blade handle 90 may be used to actuate the blade 84 to extend laterally outward of the clamping surface 53 of the second jaw 54, as shown in FIG. 9, when the clamp 50 is being used to open a sealed bag or cut an already opened bag.

Figure 10:
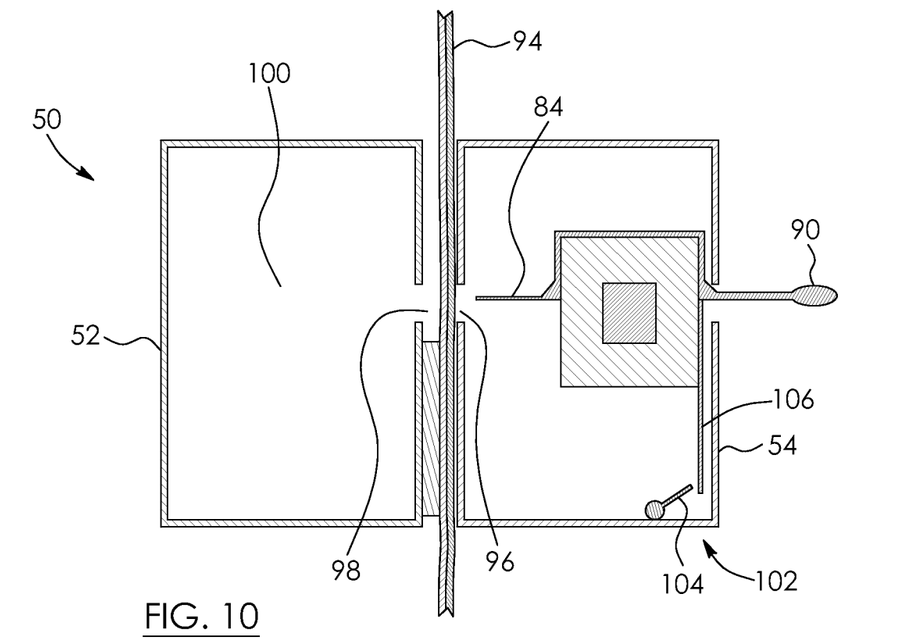
FIG. 10 is a sectional view taken along lines X-X of FIG. 8 when the clamp is clamped to a sealed bag.
Figure 11:
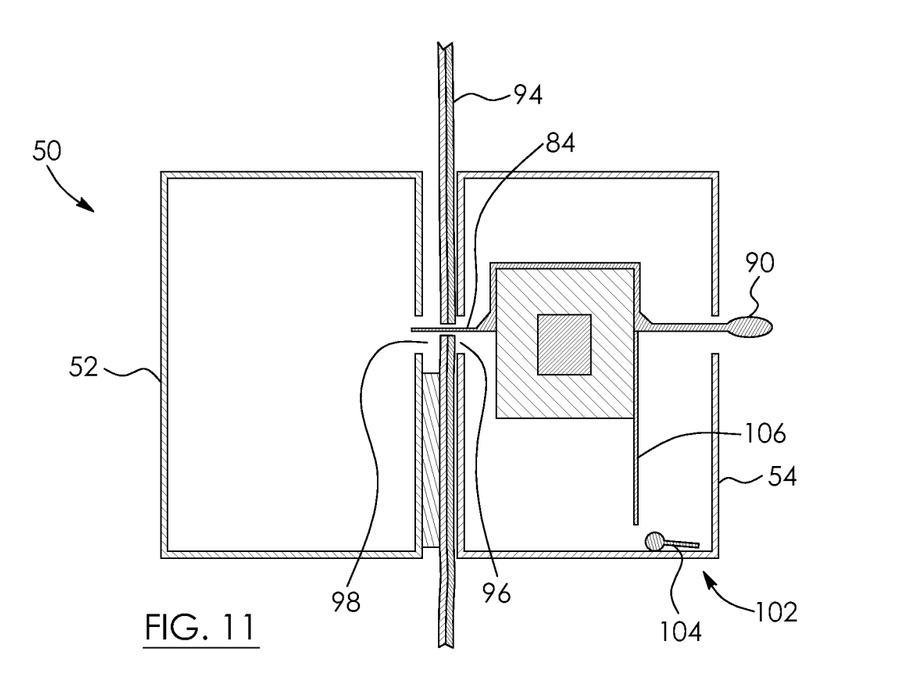
FIG. 11 is a sectional view taken along lines XI-XI of FIG. 9 when the clamp is clamped to a sealed bag.

FIGS. 10 and 11 show the clamp 50 being used to open a sealed bag 94. The clamp 50 is first clamped to the bag 94 with the blade 84 biased to a retracted position as shown in FIG. 10. The blade 84 is then actuated with the blade handle 90 to an extended position as shown in FIG. 11. In the extended position, the blade 84 extends though a slot 96 in the second jaw 54 to pierce through the bag 94. The blade 84 also extends outwardly of the second jaw 54 through a slot 98 in the first jaw 52 and into a hollow 100 of the first jaw. The blade 84 is accordingly not exposed when the bag 94 is being opened. The clamp 50 is also provided with a redundant safety mechanism 102 which, when engaged, prevents the blade 84 from being actuated to the extended position. The redundant safety mechanism 102 must be released for the blade 84 to be moved from the retracted position to the extended position. FIG. 10 shows the safety mechanism in an engaged position and FIG. 11 shows the safety mechanism in the released position.

In this example, the safety mechanism 102 includes a pivotable guard 104 which, when the safety mechanism is in the engaged position, prevents the blade 84 moving from the retracted position to the extended position by blocking movement of a flange 106 which is connected to and perpendicular with the blade 84. The flange 106 is shown in greater detail in FIG. 12. When the guard 104 is pivoted, and the safety mechanism is in the released position, the flange 106 is able to clear the guard and the blade 84 is able to move from the retracted position to the extended position.

It will be understood by a person skilled in the art that many of the details provided above are by way of example only, and are not intended to limit the scope of the invention which is to be determined with reference to the following claims.

What is claimed is:

1. A bag clamp used to open a sealed bag and releasably seal the opened bag, the bag clamp comprising:
    a first elongate jaw member having a first end, a second end, a planar clamping surface and an opening extending along a length of said planar clamping surface;
    a second elongate jaw member having a first end, a second end, and a planar clamping surface;
    a hinge coupling the first end of the first elongate jaw member and the first end of the second elongate jaw member, the bag clamp being movable between an open configuration in which the first elongate jaw member and the second elongate jaw member are angularly spaced-apart and a closed configuration in which the opening in the planar clamping surface of the first elongate jaw member is aligned with the blade reciprocatingly mounted to the second elongate jaw member;
    a cutting mechanism including a blade reciprocatingly mounted on a guide rod disposed within the second elongate jaw member, the blade being reciprocable along a length of the second elongate jaw member, and the blade being moveable between a retracted position in which the blade is disposed within the second elongate jaw member and an extended position in which the blade extends through the opening in the planar clamping surface of the first elongate jaw member; and
    a releasable locking mechanism for locking the clamp in the closed configuration, the releasable locking mechanism being disposed at the second end of the first elongate jaw member and the second end of the second elongate jaw member, and the releasable locking mechanism releasably connecting the second end of the first elongate jaw member and the second end of the second elongate jaw member.

2. A bag clamp used to open a sealed bag and releasably seal the opened bag, the bag clamp comprising:
    a first elongate jaw member having a first end, a second end, and an opening extending along a length of a planar clamping surface of the first elongate jaw member;
    a second elongate jaw member having a first end, a second end, and a planar clamping surface;
    a blade reciprocatingly mounted to the second elongate jaw member, the blade being reciprocable along a length of the second elongate jaw member, and the blade being movable between a retracted position in which the blade is disposed within the second elongate jaw member and an extended position in which the blade extends from the planar clamping surface of the second elongate jaw member;
    a releasable safety mechanism for maintaining the blade in the retracted position;
    a hinge coupling the first end of the first elongate jaw member and the first end of the second elongate jaw member, the bag clamp being moveable between an open configuration in which the first elongate jaw member and the second elongate jaw member are angularly spaced-apart, and a closed configuration in which the opening in the first elongate jaw member is aligned with the blade mounted to the second elongate jaw member so that the blade of the second elongate jaw member extends into the opening in the first elongate jaw member as the blade is reciprocated along the length of the second elongate jaw member to open the sealed bag; and
    a releasable locking mechanism for locking the bag clamp in the closed configuration, the releasable locking mechanism being disposed at the second end of the first elongate jaw member and the second end of the second elongate jaw member, and the releasable locking mechanism releasably connecting the second end of the first elongate jaw member and the second end of the second elongate jaw member, wherein a portion of the opened bag is compressed between the planar clamping surface of the first elongate jaw member and the planar clamping surface of the second elongate jaw member when the bag clamp is used to reseal the opened bag.

\* \* \* \* \*